United States Patent
Hebbar et al.

(10) Patent No.: US 9,776,090 B2
(45) Date of Patent: Oct. 3, 2017

(54) IMAGE PROCESSING METHOD, AVATAR DISPLAY ADAPTATION METHOD AND CORRESPONDING IMAGE PROCESSING PROCESSOR, VIRTUAL WORLD SERVER AND COMMUNICATION TERMINAL

(75) Inventors: Abdelkrim Hebbar, Nozay (FR); Hakim Hacid, Nozay (FR); Abderrahmane Maaradji, Massy (FR)

(73) Assignee: Alcatel Lucent, Boulogne-Billancourt (FR)

(*) Notice: Subject to any disclaimer, the term of this patent is extended or adjusted under 35 U.S.C. 154(b) by 1113 days.

(21) Appl. No.: 13/384,642

(22) PCT Filed: Jun. 30, 2010

(86) PCT No.: PCT/EP2010/059240
§ 371 (c)(1),
(2), (4) Date: Apr. 2, 2012

(87) PCT Pub. No.: WO2011/009696
PCT Pub. Date: Jan. 27, 2011

(65) Prior Publication Data
US 2012/0188277 A1    Jul. 26, 2012

(30) Foreign Application Priority Data
Jul. 24, 2009  (FR) ...................... 09 03653

(51) Int. Cl.
*A63F 13/79* (2014.01)
*A63F 13/52* (2014.01)
*G06F 3/01* (2006.01)

(52) U.S. Cl.
CPC .............. *A63F 13/79* (2014.09); *A63F 13/52* (2014.09); *G06F 3/011* (2013.01); *A63F 2300/556* (2013.01); *A63F 2300/5553* (2013.01)

(58) Field of Classification Search
CPC ..... G06N 3/006; G06F 17/3089; G06T 13/40; A63F 13/00
USPC ......................................................... 345/629
See application file for complete search history.

(56) References Cited

U.S. PATENT DOCUMENTS 7,797,345 B1* 9/2010 Martino et al. ............... 707/792
2004/0127272 A1* 7/2004 Park et al. ......................... 463/6
(Continued)

FOREIGN PATENT DOCUMENTS

CN    101360109 A    2/2009
JP    2001-109896 A   4/2001
(Continued)

OTHER PUBLICATIONS

Kosara et al., "Semantic Depth of Field," Proceedings 2001 Information Visualization, XP008120577, pp. 97-104, Oct. 22, 2001.
(Continued)

*Primary Examiner* — Gregory J Tryder
*Assistant Examiner* — Jitesh Patel
(74) *Attorney, Agent, or Firm* — Fay Sharpe, LLP

(57) ABSTRACT

When processing images in a virtual environment in which a plurality of avatars respectively representing associated users evolve, an image processing method is employed comprising the following stages: an adaptation request is received for the display of the avatars on the terminal of a given user, the request comprising at least one adaptation criterion to distinguish the display of the avatars. The data representing the avatars is modified based on the adaptation criterion, and the modified data for an adapted display of the avatars is sent to the terminal of the given user. Additionally, the display of avatars in a virtual environment may be adapted. A corresponding image processing processor, virtual world server and communication terminal for implementing such methods are also provided.

10 Claims, 3 Drawing Sheets

(56) References Cited

U.S. PATENT DOCUMENTS

Figure 5A:
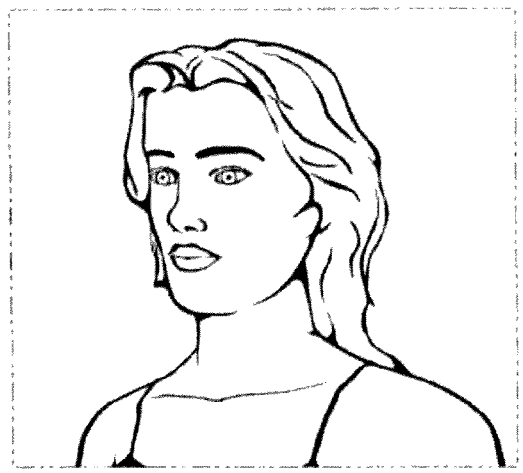

| | | |
|---|---|---|
| 2008/0081701 A1 | 4/2008 | Shuster |
| 2008/0155080 A1* | 6/2008 | Marlow et al. ............... 709/223 |
| 2009/0113326 A1 | 4/2009 | Miyamoto et al. |
| 2009/0141023 A1 | 6/2009 | Shuster |
| 2009/0144282 A1* | 6/2009 | Uramoto .......................... 707/9 |
| 2009/0144639 A1* | 6/2009 | Nims et al. ................... 715/757 |
| 2009/0165090 A1* | 6/2009 | Glasgow .......................... 726/3 |
| 2009/0259539 A1* | 10/2009 | Dawson et al. ................ 705/14 |
| 2010/0115426 A1* | 5/2010 | Liu et al. ...................... 715/757 |
| 2010/0306685 A1* | 12/2010 | Giaimo et al. ............... 715/765 |

FOREIGN PATENT DOCUMENTS

| | | |
|---|---|---|
| JP | 2009-104482 A | 5/2009 |
| WO | 2008/104782 A2 | 9/2008 |

OTHER PUBLICATIONS

Hillaire et al., "Depth-of-field Blur Effects for Fist-Person Navigation in Virtual Environments," Proceedings of ACM Symposium on Virtual Reality Software and Technology (VRST), XP002574329, pp. 204-207, Nov. 5, 2007.

Carlson et al., "Simulation Levels of Detail for Real-time Animation," Proceedings of Graphics Interface '97, XP001148939, pp. 1-8, May 21, 1997.

International Search Report for PCT/EP2010/059240 dated Aug. 2, 2010.

* cited by examiner

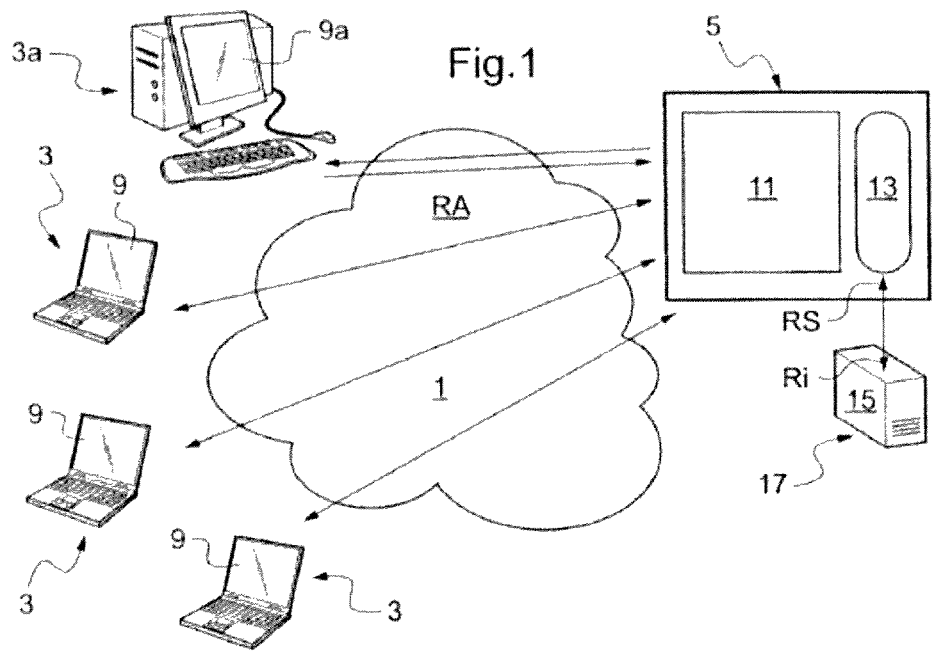
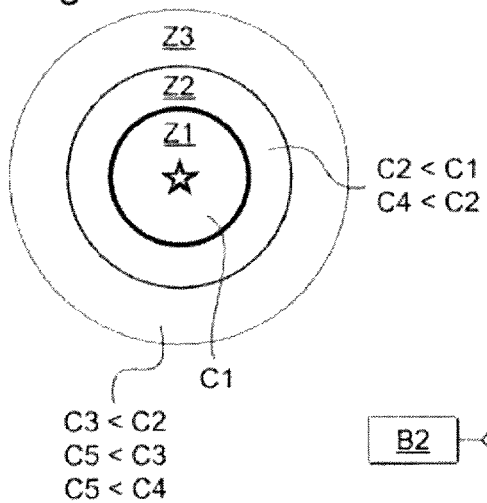
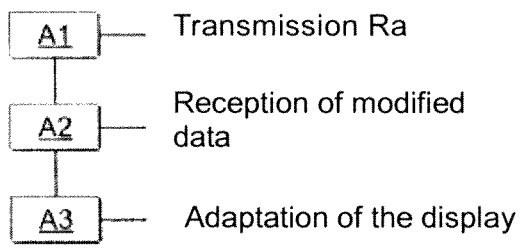
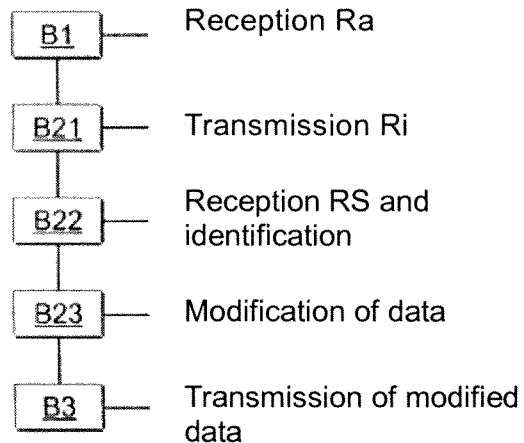

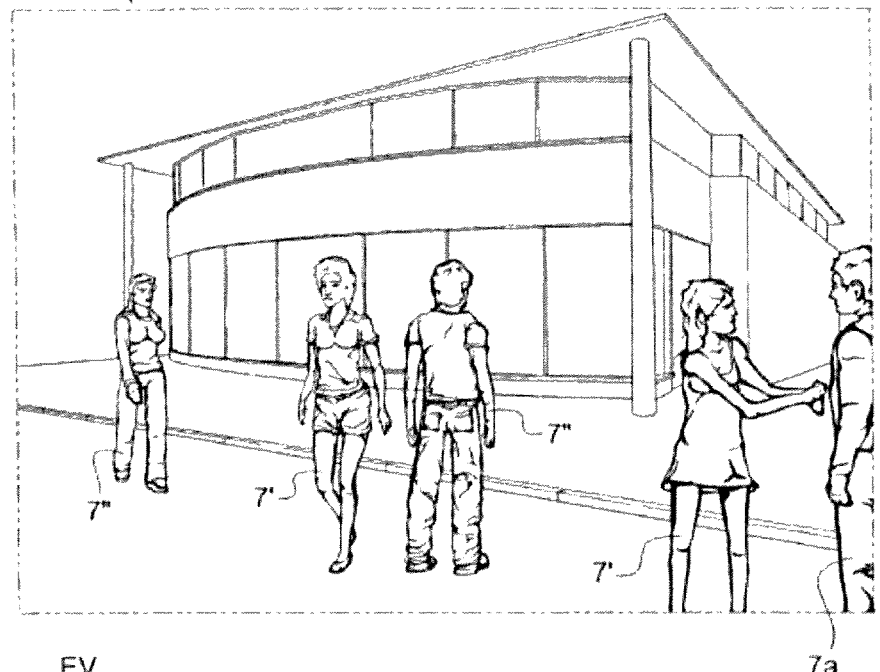
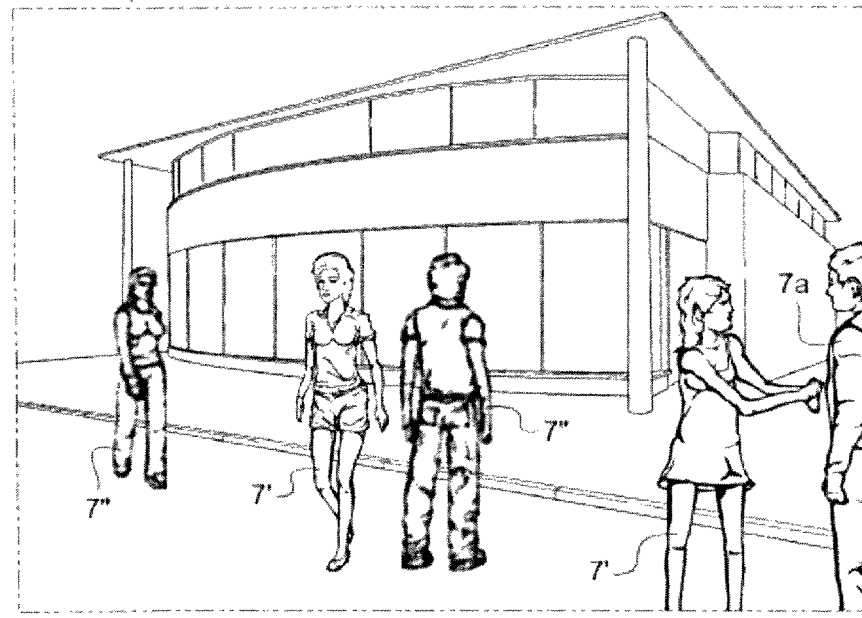

IMAGE PROCESSING METHOD, AVATAR DISPLAY ADAPTATION METHOD AND CORRESPONDING IMAGE PROCESSING PROCESSOR, VIRTUAL WORLD SERVER AND COMMUNICATION TERMINAL

The invention concerns a method for processing images in a virtual environment, an avatar display adaptation method, and a corresponding image processing processor, virtual world server and communication terminal for the implementation of said methods.

Nowadays, the development of the Internet and computer technology has made it possible to work, play and exchange information in a virtual world. In general terms, a virtual world comprises several virtual environments, each of which is a 3D digital representation imitating a real world environment.

These virtual worlds, for example virtual games or virtual meeting places and exchanges, are becoming increasingly developed.

In such virtual worlds, users can evolve interactively and communicate with other users through user representation.

Avatars are the main form of user representation used. They are generally chosen and configured manually by users based on their own preferences. An avatar may be a photo, a three-dimensional image or any graphic representation. Once the user connects to the virtual world, their avatar is displayed in the virtual world.

Furthermore, users in these virtual worlds can create a social network in which they register the users that they know and/or with whom they have communicated via avatars.

Traditionally, when a user connects to the virtual world and their avatar evolves in a virtual environment, the definition of the other avatars present in this virtual environment depends on their geographical distance from the avatar of the connected user. Here, the term "geographical distance" refers to the simulated distance between the avatars in the virtual environment in which the avatars evolve. Users can therefore see the avatars geographically close to their own avatar in more detail.

However, such an implementation requires a large amount of resources. In fact, the avatars must be permanently computed in great detail, even if these details are of no interest to the user connected to the virtual world at a precise location and time in the virtual world.

Furthermore, users cannot quickly distinguish the avatars of the users who form part of one of their social networks or in whom they are interested at a precise location and time in the virtual world.

The aim of the invention is therefore to overcome these disadvantages of the prior art, allowing the display of the avatars to be adapted while reducing the resources required to display them.

To this effect, the aim of the invention is a method for processing images in a virtual environment in which a plurality of avatars respectively representing associated users evolve, said image processing method comprising the following stages:
 an adaptation request is received for the display of the avatars on the terminal of a given user, said request comprising at least one adaptation criterion to distinguish the display of the avatars,
 the data representing the avatars is modified based on said adaptation criterion, and
 the modified data is sent for an adapted display of the avatars on the terminal of the given user.

Said image processing method may further comprise one or more of the following characteristics, taken separately or in combination:
 the adaptation criterion is a social link criterion between the given user and the users connected to the virtual environment,
 a blurring filter is applied to the avatars representing users who do not belong to a social network of the given user,
 said image processing method comprises the following stages:
  for each user connected to the virtual environment, a social link coefficient is calculated from said adaptation criterion and social network information of the given user,
  the data representing the avatars is modified based on the calculated social link coefficient,
  for each avatar representing a user belonging to a social network of the given user, a sharpness filter proportional to the calculated social link coefficient is applied,
  for each avatar representing a user who does not belong to a social network of the given user, a blurring filter inversely proportional to the calculated social link coefficient is applied.

The invention further concerns a method for adapting the display of avatars in a virtual environment in which a plurality of avatars respectively representing associated users evolve, said adaptation method comprising the following stages:
 an adaptation request is sent for the display of the avatars on the terminal of a given user, said request comprising at least one adaptation criterion to distinguish the display of the avatars,
 data is received representing the avatars, modified based on said adaptation criterion, and
 the modified avatars are displayed on the terminal of the given user.

The invention also concerns an image processing processor comprising at least one processing means for:
 receiving an adaptation request for the display of the avatars on the terminal of a given user, said request comprising at least one adaptation criterion to distinguish the display of the avatars,
 modifying the data representing the avatars based on said adaptation criterion, and
 sending the modified data for an adapted display of the avatars to the terminal of the given user.

The invention further concerns a virtual world server comprising such an image processing processor.

The invention also concerns a communication terminal comprising such an image processing processor.

The invention also concerns a user communication terminal comprising:
 a means of displaying a virtual environment in which a plurality of avatars evolve, respectively representing associated users, and
 at least one processing means for:
  sending an adaptation request for the display of the avatars on the display means, said request comprising at least one adaptation criterion to distinguish the display of the avatars,
  receiving data representing the avatars, modified based on said adaptation criterion, and
  displaying the modified avatars on the display means.

Figure 5B:
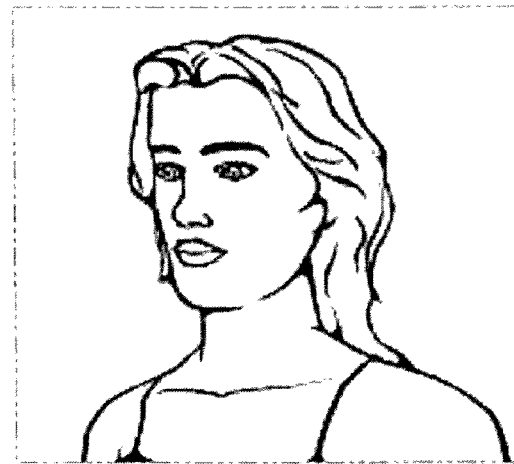
Figure 5C:

Other characteristics and advantages of the invention will become more clear upon reading the following description, given by way of example and not of limitation, with reference to the attached drawings, in which:

FIG. 1 represents in diagram form a communication network on which a plurality of communication terminals exchange data with a virtual world server, FIG. 2a is an example of the display of a virtual environment, FIG. 2b is an example of the display of a virtual environment in which the display of the avatars is adapted, FIG. 3a illustrates the stages in a method for adapting the display of avatars in a virtual environment, FIG. 3b illustrates the stages of an image processing method in a virtual environment, FIG. 4 is a diagram representing the social link with a given user in concentric zones respectively associated with an adaptation criterion, FIG. 5a is an example of the high-definition display of an avatar, FIG. 5b is an example of the medium-definition display of an avatar, and FIG. 5c is an example of the very low-definition display of an avatar Identical elements in each of these figures have the same references.

FIG. 1 shows a communication network 1, for example the Internet, a plurality of communication terminals 3a, 3 and a virtual world server 5. The terminals 3a, 3 exchange data with the virtual world server 5 on the communication network 1, so that the users of the terminals 3a, 3 can connect to the virtual world and evolve in the virtual world.

In this case "communication network" 1 shall mean any type of network capable of sending content to the terminals 3a, 3 and exchanging data or messages with said terminals 3a, 3. Any method of transmission can be envisaged.

Furthermore, in this case "communication terminal" 3a, 3 shall mean any type of equipment capable of receiving content from the communication network 1, and of exchanging data, messages and requests with said communication network 1.

It may for example be a mobile or landline telephone, a personal digital assistant (PDA), or a PC or laptop.

With reference to FIGS. 1 and 2a, each user of a terminal 3a, 3 has an associated avatar 7a, 7', 7" to represent them in a virtual environment (EV) in the virtual world displayed on a display means 9a, 9 of the terminal 3a, 3.

Each user can therefore, through their avatar 7a, 7', 7", evolve in this virtual environment (EV) and communicate with other avatars 7a, 7', 7" representing other users.

Furthermore, each user can have one or more social networks, such as friend networks, work group networks or gaming networks, in the virtual world or in another virtual exchange platform outside the virtual world. Each network brings together a group of users. Said group of users can comprise a list of pseudonyms of the users with, if desired, associated avatars or their corresponding profiles.

The user may of course form part of a community in the virtual world which also forms a social network.

In reference again to FIG. 1, the virtual world server 5 traditionally comprises at least one means 11 of managing the virtual environments in which the avatars evolve.

The virtual world server 5 further comprises at least one image processing means 13, for example an image processing processor 13. As an alternative, the processor 13 may be integrated into each terminal 3a, 3.

Said processor 13 communicates with a database 15 of the social networks of the users, whether networks in the virtual world or in other virtual exchange platforms. To do this, users must have previously entered their corresponding identifier(s) for the platforms outside the virtual world, thus allowing the database 15 access to their social networks.

In the example illustrated in FIG. 1, an external server 17 comprises said database 15. As a variant, it is the virtual world server 5 which comprises the database 15.

According to a first embodiment, when a first user of the terminal 3a connects to the virtual world and their associated avatar 7a evolves in a virtual environment (EV), the other avatars 7', 7" are initially displayed traditionally (FIG. 2a), and if the user so wishes, the display is adapted (FIG. 2b).

To that end, terminal 3a comprises at least one processing means for sending to the processor 13 during stage A1 an adaptation request Ra for the display of the avatars on the display means 9a (FIGS. 1 and 3a). This request Ra comprises at least one adaptation criterion to distinguish between the display of the avatars.

This adaptation criterion may be a social link criterion, for example a criterion for belonging to a social network of the first user of terminal 3a, where the social network may be inside or outside the virtual world. Of course, any other adaptation criterion may be used, such as those relating to interests or the frequency of exchanges.

In the example of a criterion of belonging to a social network, the avatar display must be adapted based on the social network of said first user. More precisely, second avatars 7' associated with the users of the social network are distinguished from the third avatars 7" associated with the connected users who do not belong to the social network of the first user (see FIG. 2b).

The processor 13 then comprises at least one processing means to receive the adaptation request Ra with the adaptation criterion during a stage B1, modify the data representing the avatars based on the adaptation criterion in stage B2, and send to terminal 3a the modified data in stage B3, for an adapted display of the avatars on the display means 9a (FIGS. 1 and 3b).

Terminal 3a then receives the data modified in stage A2 and displays the avatars on the display means 9a in stage A3 (FIG. 3a).

By way of example, when the adaptation criterion is one of belonging to the social network of the first user of terminal 3a, the processor 13 comprises at least one processing means for sending in stage B21 an information request Ri to the database 15 concerning the social network(s) of the first user (FIGS. 1 and 3b).

The database 15 then sends the RS data on the social network(s) of the first user to the processor 13 configured to identify from said RS data the connected users that form part of the social network of the user and those who do not form part of said network in stage B22.

The processor 13 then modifies during stage B23 the data representing the avatars so as to distinguish the second avatars 7' of the users of the social network of the first user from the third avatars 7" of the other users.

In the example illustrated in FIG. 2b, the processor 13 applies a blurring filter to the third avatars 7", so that the second avatars 7' are displayed with good definition in comparison to the third avatars 7", which are blurry.

As a variant, the third avatars 7" may be displayed transparently or shadows may be displayed for the third avatars 7". According to another alternative, the second avatars 7' may be adapted so that they are displayed larger than the third avatars 7".

The user of the first terminal 3a can therefore easily distinguish the avatars 7' of the users of their social network.

Furthermore, the processor 13 resource requirements for only a few avatars with good definition are much lower than those for a crowd of avatars with good definition. Consequently, the computation effort of the processor 13 is reduced to keep only certain avatars with good definition.

Furthermore, when the processor 13 is in the virtual world server 5, it sends less significant data on the communication network 1 to the terminal 3a.

In addition, the avatars 7', 7" may be adapted differently based on the social proximity of the users associated with the first user. In this case, the user can define several hierarchized adaptation criteria.

By way of example, the first user can define:
a first criterion, for example a criterion of belonging to a "Family" network of the first user,
a second criterion, for example a criterion of interests, such as "museums", and
a third criterion, for example a criterion of interests, such as "sport".

To illustrate this principle, refer to FIG. 4 in which three circular zones, Z1, Z2, Z3, are shown in diagram form,
the first zone Z1 is associated with the first criterion,
the second zone Z2 is associated with the second criterion,
the third zone is associated with the third criterion.

The avatars must therefore be adapted based on whether the users belong to one of the three zones Z1, Z2, Z3.

To that end, the processor 13 comprises at least one means of calculating a social link coefficient for each user based on the adaptation criteria and the social network information of the first user.

Therefore, users connected to the virtual environment (EV) and who belong to the "Family" network of the first user correspond to the first zone Z1 and are associated with a strong first social link coefficient C1.

Users connected to the virtual environment (EV) and belonging to one or more social networks of the first user with for example museums in their profile as a criterion of interest, correspond to the second zone Z2 and are associated with a second social link coefficient C2, lower than the first social link coefficient C1 (C2<C1).

Users connected to the virtual environment (EV) and belonging to one or more social networks of the first user with for example sport in their profile as a criterion of interest, correspond to the third zone Z3 and are associated with a third social link coefficient C3, lower than the second social link coefficient C2 (C3<C2).

The users connected to the virtual environment (EV) and who do not belong to a social network of the first user with for example museums in their profile as a criterion of interest, correspond to the second zone Z2 and are associated with a fourth social link coefficient C4, lower than the second social link coefficient C2 (C4<C2).

Users connected to the virtual environment (EV) and who do not belong to a social network of the first user with for example sport in their profile as a criterion of interest, correspond to the third zone Z3 and are associated with a fifth social link coefficient C5, lower than the third social link coefficient C3 and the fourth social link coefficient C4 (C5<C3; C5<C4).

Once the coefficients are calculated, the processor 13 adapts the users differently based on these calculated coefficients.

For example, for each second avatar 7', a sharpness factor proportional to the calculated social link coefficient is applied.

Therefore,
the second avatars 7' of the users of zone 1 associated with the first coefficient C1 may be displayed in very high-definition,
the second avatars 7' of the users of zone 2 associated with the second coefficient C2 may be displayed in high-definition (FIG. 5a), and
the second avatars 7' of the users of zone 3 associated with the third coefficient C3 may be displayed in medium-definition (FIG. 5b).

Similarly, for each third avatar 7", a blurring factor inversely proportional to the calculated social link coefficient is applied.

Therefore,
the third avatars 7" of the users of zone 2 associated with the fourth coefficient C4 may be displayed in medium-definition (FIG. 5b), and
the third avatars 7" of the users of zone 3 associated with the fifth coefficient C5 may be displayed in low-definition.

All other avatars associated with users for whom the calculated social link coefficient is null may be for example displayed in very low-definition (FIG. 5c).

A second embodiment differs from the first embodiment in that when a first user connects to the virtual environment (EV), the avatar display is directly adapted based on adaptation criteria defined by the user.

It is therefore understood that the display of the avatars in a virtual mode is adapted simply in order to quickly distinguish the avatars of the users of interest to a given first user at a precise location and time in the virtual environment, while reducing the resources required.

The invention claimed is:

1. Method for processing images in a virtual environment in which a plurality of avatars respectively representing associated users evolve, said image processing method comprising:
an adaptation request is received for the display of the avatars on a terminal of a given user, said request comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
the data representing the avatars is modified based on said adaptation criterion, and
the modified data for an adapted display of the avatars is sent to the terminal of the given user.

2. Image processing method according to claim 1, in which a blurring filter is applied to the avatars representing users who do not belong to a social network of the given user.

3. Method according to claim 1, wherein said image processing method comprises:
for each user connected to the virtual environment, a social link coefficient is calculated from said adaptation criterion and social network information of the given user,
the data representing the avatars is modified based on the calculated social link coefficient.

4. Image processing method according to claim 3, in which for each avatar representing a user belonging to a social network of the given user, a sharpness filter proportional to the calculated social link coefficient is applied.

5. Image processing method according to claim 3, in which for each avatar representing a user who does not belong to a social network of the given user, a blurring filter inversely proportional to the calculated social link coefficient is applied.

6. Method for adapting the display of avatars in a virtual environment in which a plurality of avatars respectively representing associated users evolve, said adaptation method comprising:
- an adaptation request is sent for the display of the avatars on a terminal of a given user, said request comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
- data representing the avatars modified based on said adaptation criterion is received, and
- the modified avatars are displayed on the terminal of the given user.

7. Image processing processor adapted to:
- receive an adaptation request for the display of avatars on a terminal of a given user, said request comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
- modify the data representing the avatars based on said adaptation criterion, and
- send the modified data for an adapted display of the avatars to the terminal of the given user.

8. Virtual world server comprising an image processing processor adapted to:
- receive an adaptation request for the display of avatars on a terminal of a given user, said request comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
- modify the data representing the avatars based on said adaptation criterion, and
- send the modified data for an adapted display of the avatars to the terminal of the given user.

9. Communication terminal comprising an image processing processor adapted to:
- receive an adaptation request for the display of avatars on a terminal of a given user, said request (Ra) comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
- modify the data representing the avatars based on said adaptation criterion, and
- send the modified data for an adapted display of the avatars to the terminal of the given user.

10. Communication terminal of a user comprising:
- a display on which is displayed a virtual environment in which a plurality of avatars evolve, respectively representing associated users, and
- at least one processor adapted to:
  - send an adaptation request for the display of the avatars on a display, said request comprising at least one adaptation criterion to distinguish the display of the avatars, wherein the at least one adaptation criterion is a social link criterion between the given user and the users connected to the virtual environment thereby distinguishing the display of the avatars associated with users of the social network of the given user from the display of avatars associated with users who do not belong to the social network;
  - receive data representing the avatars modified based on said adaptation criterion, and
  - display the modified avatars on the display.

* * * * *